US008351056B2

(12) United States Patent
Shimura

(10) Patent No.: US 8,351,056 B2
(45) Date of Patent: Jan. 8, 2013

(54) IMAGE PROCESSING IN ACCORDANCE WITH POSITION OF MEMBER

(75) Inventor: Norio Shimura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 1313 days.

(21) Appl. No.: 11/842,874

(22) Filed: Aug. 21, 2007

(65) Prior Publication Data

US 2008/0062449 A1 Mar. 13, 2008

(30) Foreign Application Priority Data

Sep. 11, 2006 (JP) ................................ 2006-245807

(51) Int. Cl.
*G06F 3/12* (2006.01)

(52) U.S. Cl. ..................... 358/1.13; 358/1.12; 358/1.18; 382/317

(58) Field of Classification Search ................ 358/1.12, 358/1.13, 1.18; 382/317
See application file for complete search history.

(56) References Cited

U.S. PATENT DOCUMENTS

| | | | | |
|---|---|---|---|---|
| 4,616,269 | A * | 10/1986 | Mori | 358/496 |
| 5,124,810 | A * | 6/1992 | Seto | 358/406 |
| 5,689,759 | A * | 11/1997 | Isemura et al. | 399/45 |
| 6,577,409 | B1 * | 6/2003 | Barker et al. | 358/468 |
| 2004/0085596 | A1 * | 5/2004 | Chen et al. | 358/493 |
| 2004/0145784 | A1 * | 7/2004 | Murray et al. | 358/474 |
| 2007/0024899 | A1 * | 2/2007 | Henry et al. | 358/1.15 |

FOREIGN PATENT DOCUMENTS

| | | |
|---|---|---|
| JP | 5-238097 | 9/1993 |
| JP | 6-072562 | 3/1994 |
| JP | 9-301551 | 11/1997 |

* cited by examiner

*Primary Examiner* — Benjamin O Dulaney
(74) *Attorney, Agent, or Firm* — Fitzpatrick, Cella, Harper & Scinto

(57) ABSTRACT

The invention provides a multi-function printer not requiring exclusive components (principally electrical components) for reading the print settings and thus being free from a cost increase, and a control method therefor. For print settings such as a paper size and a print quality in a copying or a direct printing, a lever is provided for each print setting item. Before executing the reading and printing operations of copying or direct printing, position of each lever is read and the setting of each print setting item is analyzed based on the position of each lever, and the reading and printing operations are executed according to thus analyzed settings.

6 Claims, 7 Drawing Sheets

FIG. 5A

| | PAPER SIZE | |
|---|---|---|
| | START | END |
| A4 | 90 | 110 |
| L | 120 | 140 |
| 2L | 150 | 170 |
| POST CARD | 180 | 200 |

FIG. 5B

| | PAPER TYPE | |
|---|---|---|
| | START | END |
| PLAIN PAPER | 240 | 260 |
| PR | 270 | 290 |
| SP | 300 | 320 |

FIG. 5C

| | PRINT QUALITY | |
|---|---|---|
| | START | END |
| FINE | 360 | 380 |
| STANDARD | 390 | 410 |
| SPEEDY | 420 | 440 |

FIG. 5D

| | COLOR/MONOCHROME | |
|---|---|---|
| | START | END |
| COLOR | 480 | 500 |
| MONOCHROME | 510 | 530 |

FIG. 9
INFORMATION ON PRINT SETTING OBTAINED FROM DIGITAL CAMERA
| | (a) PRINT SETTING OF DIGITAL CAMERA | (b) PRINT SETTING OF SETTING LEVERS | (c) PRINT SETTING IN PRINTING |
|---|---|---|---|
| PAPER SIZE | L | A4 | L |
| PAPER TYPE | PR | PLAIN PAPER | PR |
| PRINT QUALITY | default | STANDARD | STANDARD |
| (COLOR/MONOCHROME) | — | (COLOR) | |
FIG. 10A
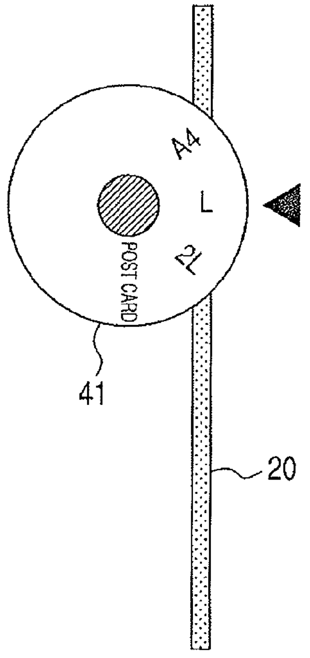
FIG. 10B
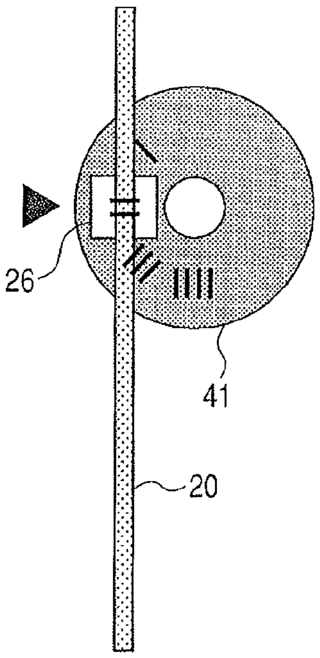

IMAGE PROCESSING IN ACCORDANCE WITH POSITION OF MEMBER

BACKGROUND OF THE INVENTION

1. Field of the Invention

The present invention relates to a multi-function printer, and more particularly to a multi-function printer capable of various print settings for executing reading and printing operations.

2. Description of the Related Art

Among the recent printers, a multi-function printer equipped with a scanner and a printer is pervasive in the market. Along with this trend, the printer is advancing in the multi-functional capability.

For example available is a printer that has, in addition to basic functions such as a copying, a PC printing and a PC scanning, a direct printing capability by having a memory card slot for inserting a memory card and for printing image data in such memory card by the printer only.

Within such multi-function printer, there is known an apparatus equipped with an operation panel for the user to input a print setting instruction and the like and a display apparatus such as a liquid crystal viewer for displaying image data. Thus the user can achieve print settings such as a paper size and a print quality in a copying operation or a direct printing operation, by manipulating the operation panel while observing the display apparatus.

Also following references are known in relation to the print settings such as a paper size and a print quality in a copying operation or a direct printing operation.

Japanese Patent No. 3305011 discloses a configuration in which a paper cassette is provided with a switch specific to the paper size, and, when the cassette is mounted, the paper size is identified in advance, based on an electric signal output by the switch corresponding to the mounted cassette.

Also Japanese Patent Application Laid-Open No. H09-301551 proposes a configuration in which a sensor reads a paper type indication, provided on a paper set in a paper supply aperture or on a packaging member for the paper, thereby identifying a paper size, a paper type and the like.

Also Japanese Patent Application Laid-Open No. H05-238097 proposes a product in which an operation panel or the like for print settings is not provided in the main body of the multi-function printer, and the print settings are executed from a utility software of a PC, connected with the multi-function printer through an interface.

It is proposed to execute the print settings by printing a setting sheet, by marking the printed setting sheet by the user and by reading thus marked setting sheet by a reading apparatus.

However, the print setting methods disclosed in the aforementioned references are associated with following drawbacks.

An operation panel and a display apparatus provided on the multi-function printer, though improve the convenience of use, require electric component parts and elevate the cost, whereby an inexpensive multi-function printer cannot be provided to the user.

Also in the method of providing the cassette with a switch specific to the paper size, electric component parts are required in the cassette and in the main body of the multi-function printer to elevate the cost, whereby an inexpensive multi-function printer cannot be provided to the user.

Also in the method of reading the paper type indication of the paper by the sensor, a sensor for reading the paper type indication has to be provided in the vicinity of the paper supply aperture, thus requiring electric component parts and elevating the cost, whereby an inexpensive multi-function printer cannot be provided to the user.

Also the method of executing the print setting on a PC connected with the multi-function printer does not require an additional cost and allows to provide an inexpensive multi-function printer, but the setting cannot be executed unless a PC is available. Therefore, the convenience of use becomes very poor in case of a copying or a direct printing in a stand-alone mode without a PC, that should be the feature of the multi-function printer.

Also in the method of executing the print setting with a setting sheet, it is necessary to prepare the setting sheet by printing, thus being cumbersome for changing the setting in a simple manner. Also this method involves problems that the reading of set values from the setting sheet requires complex processing such as a positional correction for an aberration or a skew in the setting sheet at the reading operation therefor and a correction for detection errors resulting from a density and a size of the mark formed by the user on the sheet.

Also when the display apparatus is absent, the current print setting cannot be confirmed on the display apparatus, so that a setting sheet or a setting confirmation sheet has to be printed in order to confirm the print setting, thus resulting in a poor convenience of use.

SUMMARY OF THE INVENTION

According to the present invention, for print settings such as a paper size and a print quality in a copying operation or a direct print operation, a lever is provided for each item of such print settings. Prior to the execution of reading and printing in such copying or direct print operation, position of each lever is read, and the setting of each print setting item is analyzed according to the position of each lever, whereby the reading and printing operations are executed according to thus analyzed setting.

Further features of the present invention will become apparent from the following description of exemplary embodiments with reference to the accompanying drawings.

BRIEF DESCRIPTION OF THE DRAWINGS

FIGS. 5A, 5B, 5C and 5D are views indicating coordinate positions for judging set values for the respective setting levers, in the exemplary embodiment 1.

FIG. 9 is a view illustrating an example of print setting information obtained from a digital camera.

FIGS. 10A and 10B are conceptual views illustrating, in an exemplary embodiment 2 of the present invention, a relationship of a paper size setting lever 41 which is one of the setting levers, a sensor 20, and a slit 26.

DESCRIPTION OF THE EMBODIMENTS

Figure 1:
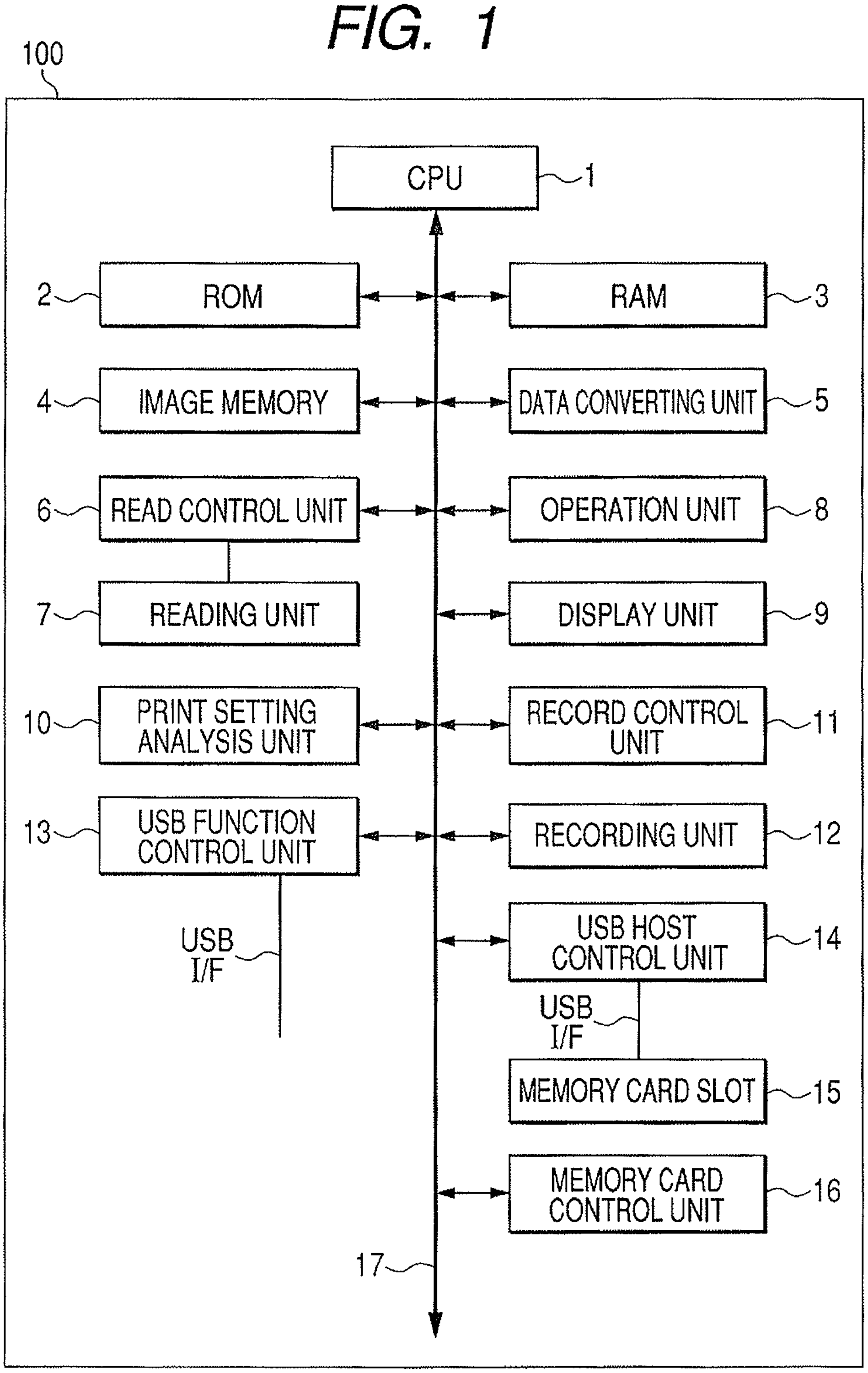
FIG. 1 is a block diagram illustrating a schematic configuration of a multi-function printer 100 constituting an exemplary embodiment 1 of the present invention.

FIG. 1 is a block diagram illustrating a schematic configuration of a multi-function printer 100 constituting an exemplary embodiment 1 of the present invention.

The multi-function printer 100 includes a CPU 1, a ROM 2, a RAM 3, an image memory 4, a data converting unit 5, a read control unit 6, a reading unit 7, an operation unit 8, a display unit 9, a print setting analysis unit 10, a record control unit 11, and a recording unit 12. The multi-function printer 100 further includes a USB function control unit 13, a USB host control unit 14, a memory card slot 15, a memory card control unit 16, and a CPU bus 17.

The CPU 1 is a system control unit, and controls the entire multi-function printer 100. The ROM 2 stores a control program to be executed by the CPU 1, a program of an incorporated operating system (OS), etc.

The RAM 3 is constituted for example of an SRAM (static RAM), serving to store program control variables, set values registered by the operator, management data of the multi-function printer 100, etc. and further having a buffer area for various works. The image memory 4 is constituted for example of a DRAM (dynamic RAM) and accumulates image data.

The data converting unit 5 executes conversions of image data, such as analysis of page description language (PDL) and CG (computer graphics) development of character data.

The read control unit 6 applies, on the image signal obtained by the reading unit 7, various image processings such as a binarizing process and a halftone process by an unillustrated image process control unit, and outputs a high-definition image data. The reading unit 7 is constituted of a CCD, a CIS or the like and optically reads the original to thereby convert into an electrical image signal.

Figure 2:
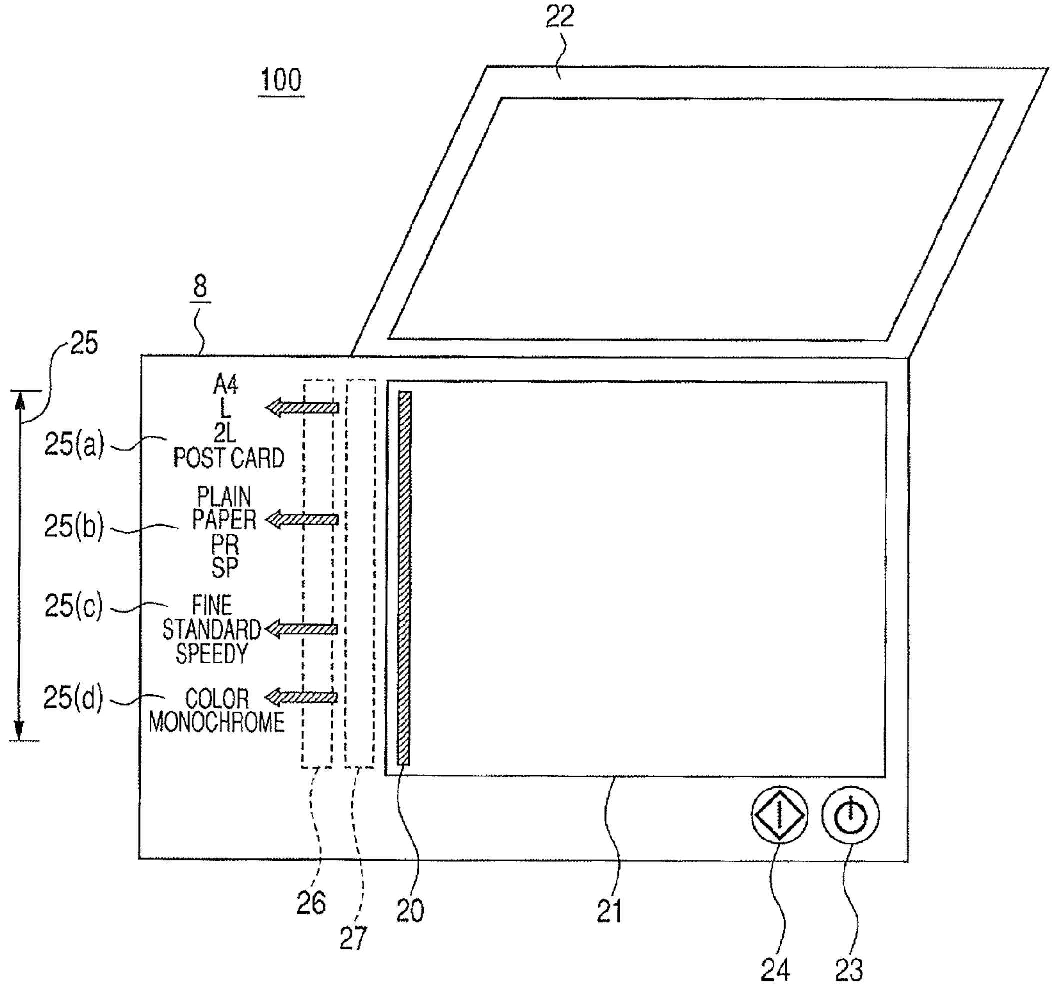
FIG. 2 is a schematic perspective view illustrating the multi-function printer 100 including an operation unit 8 and a display unit 9.

The operation unit 8 is constituted of keys accessible from the CPU 1, and levers readable by the reading unit 7. The operation unit 8 includes a power supply key, a start key, a paper size setting key and the like, which are used for example in case of power on/off of the multi-function printer 100, execution of a copying or a direct printing such as image printing from a memory card, and print setting such as paper size setting. The levers readable by the reading unit 7 are setting levers 25 as illustrated in FIG. 2. The setting levers 25 are constituted of a paper size setting lever 25(*a*), a paper type setting lever 25(*b*), a print quality setting lever 25(*c*), and a color/monochromatic setting lever 25(*d*).

The display unit 9 is constituted of LED (light-emitting diode), and indicates for example a state of the multi-function printer.

The print setting analysis unit 10 analyzes an image signal of levers (image signal of lever positions) read by the reading unit 7, and, based on the result of analysis of each lever, acquires print setting information represented by each lever.

The record control unit 11 applies, on the image data to be printed, various image processings such as a smoothing process, a recording density correction process and a color correction by an unillustrated image process control unit, for conversion into an image data for printing, which is accumulated in the image memory 4. It also periodically acquires a status information data of the recording unit 12.

The recording unit 12 is a printing apparatus formed by a laser beam printer, an ink jet printer or the like. It reads the image data for printing, converted in the record control unit 11 and accumulated in the image memory 4, and printing the color image data or the monochromatic image data on a printing medium.

The USB function control unit 13 executes a communication control for the USB interface. It executes a protocol control according to the USB communication standard, thereby converting the data from a USB control task executed by the CPU 1 into a packet and transmitting a USB packet to an external information processing terminal. Also the USB function control unit 13 converts a USB packet from the external information processing terminal into data for transmission to the CPU 1.

The USB host control unit 14 is a control unit for executing a communication with the protocol defined in the USB communication standard. The USB communication standard is a standard for executing a high-speed bidirectional data communication, enabling connection of plural hubs or functions (slaves) to a single host (master). The USB host control unit 14 performs the function of the host in the USB communication.

The memory card slot 15 is connected to the USB host control unit 14 through a USB interface, and accepts a detachable memory card. The memory card control unit 16 executes data writing and reading by accessing to an image data file, stored in the memory card mounted in the memory card slot 15.

In the following, a detailed description will be given on the setting function for various print settings, for executing the reading/printing operations in the exemplary embodiment 1.

FIG. 2 is a schematic view of a multi-function printer 100, including an operation unit 8 and a display unit 9.

The multi-function printer 100 includes a sensor 20, an original table 21, a pressure plate 22, a power supply key 23, a start key 24, setting levers 25, a slit 26 and a sensor correction sheet 27.

The sensor 20, constituted of a CCD, a CIS or the like, scans the original table 21 to optically read an original for conversion into an electrical image signal. The sensor 20 is also used in reading the setting levers 25. The original table 21 is constituted of a glass plate, and an original placed thereon is read by means of the sensor 20.

The pressure plate 22 is constituted of a white sheet member. The pressure plate 22 is normally used in a closed state in case of executing a scanning or copying operation, and serves to press the original. The power supply key 23 is accessible from the CPU 1, and is used for instructing on/off operation for the power supply of the multi-function printer 100. The power supply key 23 has a structure of a self-illuminating key, incorporating an LED (light-emitting diode) which displays the on/off state of power supply of the multi-function printer 100.

The start key 24 is accessible from the CPU 1, and is used for instructing a copying or a direct printing such as an image printing from the memory card.

The setting levers 25 are levers readable by the reading unit 7, through the sensor 20, and include a paper size setting lever 25(*a*), a paper type setting lever 25(*b*), a print quality setting lever 25(*c*), and a color/monochromatic setting lever 25(*d*). The user executes print settings by sliding the setting levers 25(*a*), 25(*b*), 25(*c*) and 25(*d*) in the vertical direction in FIG. 2.

The paper size setting lever 25(*a*) is used for setting a paper size to be used in the printing operation, and designates a paper size such as "A4", "L", "2L" or "postcard" by a sliding motion in the vertical direction in FIG. 2. The paper type setting lever 25(*b*) is used for designating a type of the paper to be used in the printing operation, and designates a paper type such as "plain paper", "PR" or "SP" by a sliding motion in the vertical direction in FIG. 2.

The print quality setting lever 25(*c*) is used for designating the print quality in the printing operation, and designates a print quality of "fine", "standard" or "speedy" by a sliding motion in the vertical direction in FIG. 2. The color/monochromatic setting lever 25(*d*) is used for designating a color or monochromatic mode in the printing operation, and designates "color" or "monochromatic" by a sliding motion in the vertical direction in FIG. 2.

The setting levers 25, when seen from the rear side (side of the sensor 20), have a slit 26 for reading the setting levers 25, and the sensor 20 reads the setting levers 25 across the slit 26. The setting levers 25, when seen from the rear side (side of the sensor 20), are black-colored with a certain width, and are whitish colored in the opposite side.

In FIG. 2, thick arrows directed from right to left indicate the moving direction of the sensor 20, and indicate that the sensor 20 simultaneously detects the positions of the paper size setting lever 25(*a*), the paper type setting lever 25(*b*), the print quality setting lever 25(*c*) and the color/monochromatic setting lever 25(*d*).

The sensor correction sheet 27 is provided is provided on the rear side of an external casing between the original table 21 and the slit 26, and is constituted of a white sheet member, thus being utilized for calibration correction and shading correction of the sensor 20.

Figure 3:
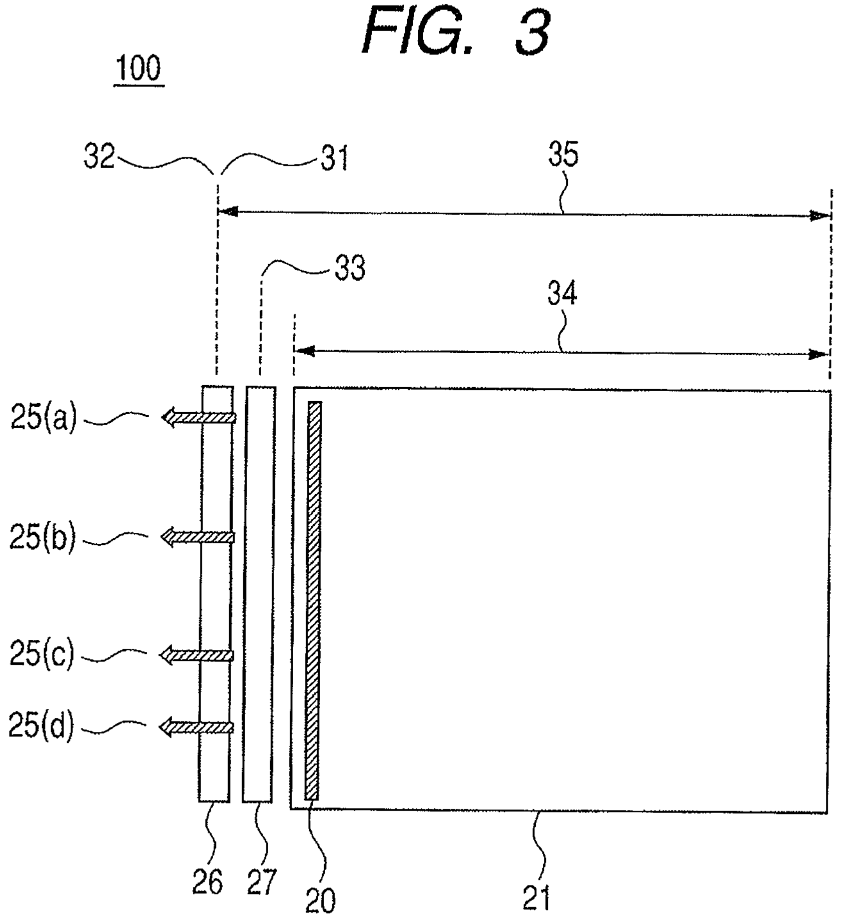
FIG. 3 is a conceptual view illustrating, in the multi-function printer 100, a positional relationship of a sensor 20, an original table 21, setting levers 25 (slit 26) and a sensor correction sheet 27.

FIG. 3 is a conceptual view illustrating a positional relationship, in the multi-function printer 100, among the sensor 20, the original table 21, the setting levers 25 (slit 26) and the sensor correction sheet 27.

A sensor stand-by position 31 is a position where the sensor 20 is located in a state where the power supply is turned off or in a stand-by state when the power supply is turned on. A setting lever reading position 32 is a position where the sensor 20 is located in reading the positions of the setting levers 25, and corresponds to the position of the slit 26. In the exemplary embodiment 1, the sensor stand-by position 31 and the setting lever reading position 32 are same.

A sensor correction position 33 is a position where the sensor 20 is located in case of a calibration correction or a shading correction for the sensor 20, and is same as the position of the sensor correction sheet 27. An original reading range 34 is a range in which the sensor 20 is movable for reading the original set on the original table 21. Thus, the sensor 20 can move over a range from the sensor stand-by position 31 to a non-reference side of the original reading range 34 (sensor movable range 35).

In case of executing a print setting such as a paper size setting or a print quality setting at a copying operation or a direct printing operation, the sensor 20 is at first displaced to the setting lever reading position 32. Since the sensor 20 is normally located at the sensor stand-by position 31, the actual displacement may not be executed. Thereafter the sensor 20 executes reading of a line, thus reading the states of the setting levers 25 across the slit 26. The reading resolution in such operation need not be of a high resolution, and for example a resolution of 75 dpi is sufficient.

Figure 4:
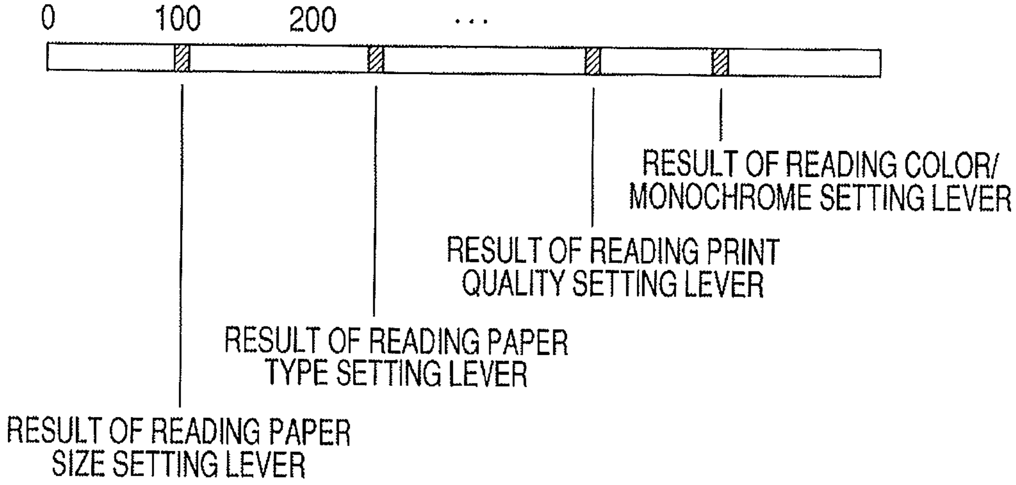
FIG. 4 is a view illustrating concept of data obtained by the sensor 20 in a 1-line reading in a setting lever reading position 32.

FIG. 4 is a conceptual view illustrating data obtained by the sensor 20 upon reading one line in the setting lever reading position 32.

The respective positions of the setting levers 25 are read as indicated in black color. From left to right in FIG. 4, there are illustrated a reading position of the paper size setting lever 25(*a*), indicated by the first black position, and, in succession, reading positions for the paper type setting lever 25(*b*), the print quality setting lever 25(*c*) and the color/monochromatic setting lever 25(*d*).

Then the print setting analysis unit 10 compares the black read position (coordinate position) with information of plural set value positions (coordinate positions) in each setting lever, to determine the setting designated by each setting lever.

FIGS. 5A to 5D illustrate, in the exemplary embodiment 1, coordinate positions for determining the set values for each setting lever.

FIG. 5A illustrates coordinate positions for determining the set value of the paper size setting lever; FIG. 5B illustrates coordinate positions for determining the set value of the paper type setting lever; FIG. 5C illustrates coordinate positions for determining the set value of the print quality setting lever; and FIG. 5D illustrates coordinate positions for determining the set value of the color/monochromatic setting lever.

In the following, an example of determining the set state of the paper size setting lever 25(*a*) will be described.

FIG. 5A indicates the coordinate positions for determining the set values of the paper size setting lever 25(*a*), and, for example when the black read data is present within a range from a start coordinate "90" to an end coordinate "110", the paper size setting lever 25(*a*) is determined to indicate the A4 size.

In determining the set state of the paper size setting lever 25(*a*), a number of black data is counted in each section from the start coordinate to the end coordinate in FIG. 5A, and a section where the number of black data is largest is determined as the set value of the paper size setting lever 25(*a*).

The set value indicated by the coordinate position of the lever is determined in a similar manner, also for the paper type setting lever 25(*b*), the print quality setting lever 25(*c*) and the color/monochromatic setting lever 25(*d*).

Now there will be described a print setting function in the exemplary embodiment 1, in case of executing a copying operation or a direct print operation for a memory card image.

Figure 6:
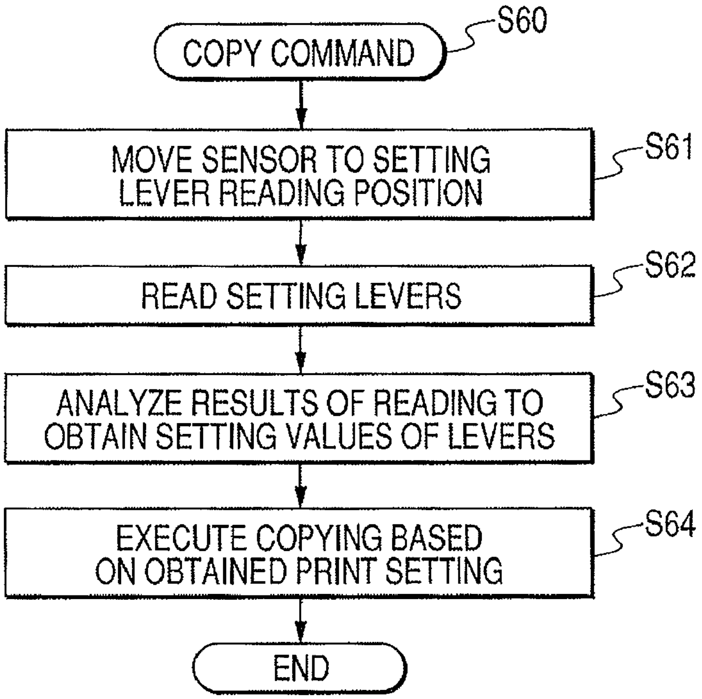
FIG. 6 is a flow chart illustrating an example of a copying operation sequence including a print setting function in the exemplary embodiment 1.

FIG. 6 is a flow chart illustrating an example of the copying procedure including the print setting function, in the exemplary embodiment 1.

At first the user sets an original to be copied on the original table 21, and executes necessary print settings by moving the setting levers 25, such as the paper size setting lever 25(*a*), to respective desired positions so as to obtain desired result of copying. Then the start key 24 is depressed to instruct a copying operation (S60). The CPU 1, upon detecting the depression of the start key 24, activates the following copying process.

When the copying process is activated, the sensor 20 is displaced to the setting lever reading position 32 (S61). As the sensor 20 is normally located in the sensor stand-by position 31, the actual displacement may be dispensed with.

Subsequently, in order to acquire the positions of the setting levers 25, the sensor 20 reads one line (S62). In the reading operation for the setting levers 25, the shading correction for correcting the fluctuation in the pixel sensitivities of the sensor 20 is not particularly necessary, since a high reading precision is not required. When a result of correction, executed in a preceding reading operation as in a copying operation, is available, such result may be utilized.

In case of executing the shading correction, the sensor 20 is at first moved to the sensor correcting position 33, in which the shading correction is executed, and is then displaced to the setting lever reading position 32, in which the setting levers 25 are read.

Subsequently, the print setting analysis unit 10 analyzes the acquired results of reading of the setting levers by the aforementioned method, thereby acquiring the set values respectively indicated by the setting levers (S63). As an example, when the setting levers on the operation panel are in a state illustrated in FIG. 2, print settings are acquired for a paper size: A4, a paper type: plain paper, a print quality: standard, and a color/monochromatic mode: color.

Then a process for a copying operation is executed according to thus acquired print settings (S64). At first a reading resolution at the reading operation in the copying is determined according to the designations of the paper type and the print quality, and the sensor 20 is subjected to a shading correction corresponding to thus determined resolution.

In the case that a result of correction, executed in a preceding reading operation as in a copying operation, is available, such result may be utilized. In case of executing the shading correction, the sensor 20 is moved to the sensor correcting position 33, in which the shading correction is executed. Subsequently, the sensor 20 is moved to an end part of the original reading range 34, and reads the original, set on the original table 21, as an image signal, while being moved in the original reading range 34 with the resolution designated above and with the designated paper size.

The read control unit 6 applies, on the obtained image signal, various image processings such as a binarization process and a halftone process according to the acquired print settings, thereby achieving conversion into high-definition image data. Also the record control unit 11 executes various image processings such as a smoothing process, a recording density correcting process and a color correction, according to the acquired print settings, thereby achieving conversion into image data for printing, which is stored in the image memory 4. Then the recording unit 12 reads the image data for printing, stored in the image memory 4, and prints the color or monochromatic image data onto a printing medium. In this manner, a copying operation can be executed according to the various print settings.

Also in case of direct printing of a memory card image, the print settings are acquired in the exemplary embodiment 1, in a similar manner as described above.

Figure 7:
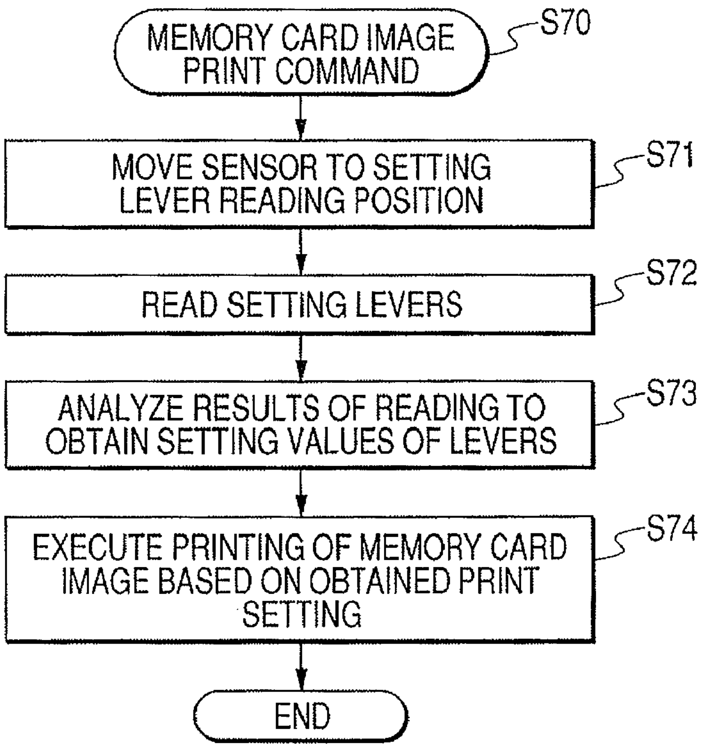
FIG. 7 is a flow chart illustrating an example of a direct print operation sequence for a memory card image, in the exemplary embodiment 1.

FIG. 7 is a flow chart illustrating an example of the direct printing procedure for the memory card image, in the exemplary embodiment 1.

At first the user mounts a memory card in the memory card slot 15, then selects an image data to be printed, and executes necessary print settings by moving the setting levers 25, such as the paper size setting lever 25(*a*), to respective desired positions so as to obtain desired result of printing. Then the start key 24 is depressed to instruct a direct printing operation (S70).

When the direct printing process is activated, the sensor 20 is displaced to the setting lever reading position 32 (S71), and, in order to acquire the status of the setting levers 25, the sensor 20 reads one line (S72). Then the print setting analysis unit 10 analyzes the acquired results of reading of the setting levers by the aforementioned method, thereby acquiring the set values respectively indicated by the setting levers (S73).

Then, a process for the direct printing operation is executed according to the print settings thus acquired (S74). At first the memory card control unit 16 reads the desired image data file, stored in the memory card mounted in the memory card slot 15. The record control unit 11 executes, on the read image data, various image processings such as a smoothing process, a recording density correcting process and a color correction, according to the acquired print settings such as the designated paper size and the designated paper type, thereby achieving conversion into image data for printing, which is stored in the image memory 4.

Then the recording unit 12 reads the image data for printing, stored in the image memory 4, and prints the color or monochromatic image data onto a printing medium. In this manner, a direct printing operation of the memory card image can be executed according to the various print settings.

Also in case of the direct printing of the memory card image, the printing operation may also be executed without the aforementioned displacement of the sensor 20 from the setting lever reading position 32 (=sensor stand-by position 31).

Also in the multi-function printer 100, a digital camera may be connected to a USB connector, which is connected to the USB host control unit 14. When a digital camera is connected, a direct printing can be executed, according to a PictBridge standard, by transferring the image data from the digital camera directly to the printer, without utilizing a PC. Also among the digital cameras, there is available a model that can designate various print settings through a user interface provided in the digital camera.

In the following, a direct printing procedure for image data of a digital camera in the multi-function printer 100 will be described.

Figure 8:
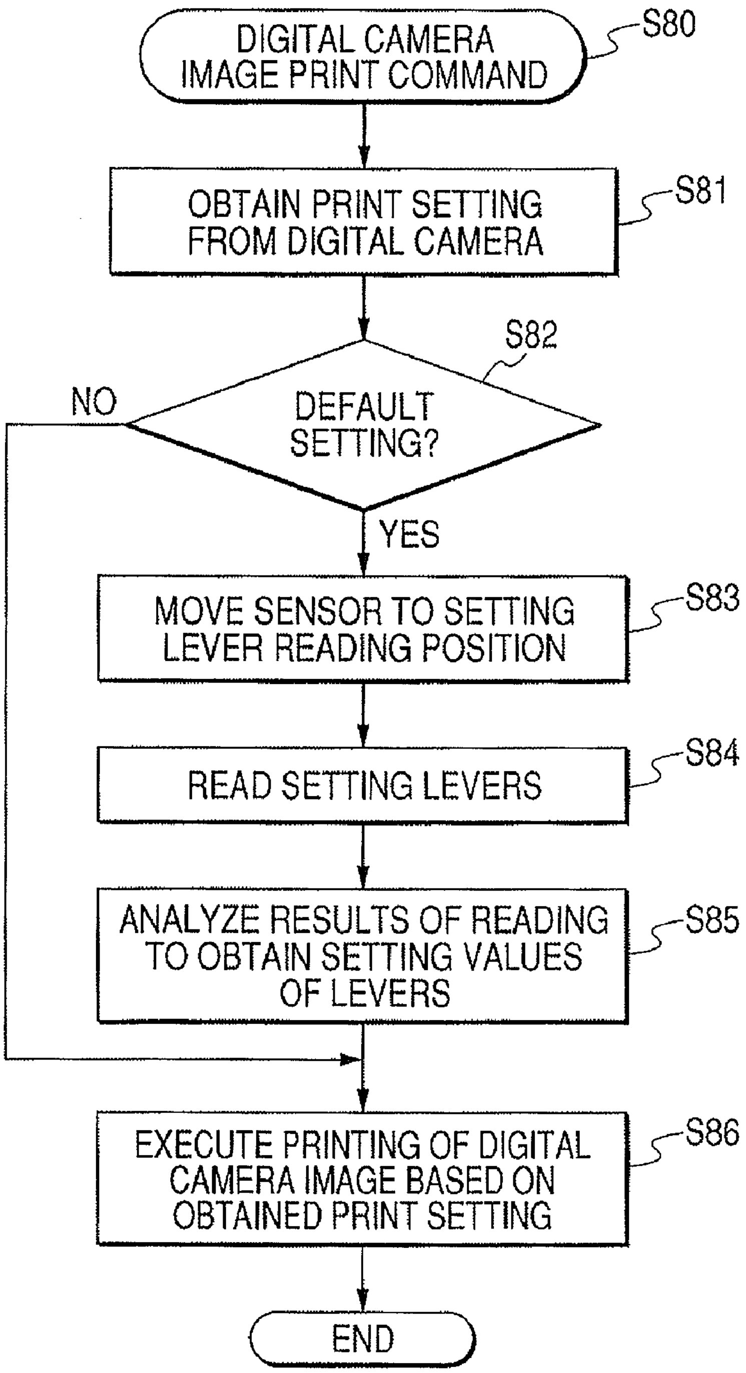
FIG. 8 is a flow chart illustrating an example of a direct print operation sequence for a digital camera image, in the exemplary embodiment 1.

FIG. 8 is a flow chart illustrating an example of a direct printing procedure for a digital camera image, in the exemplary embodiment 1.

At first the user mounts the digital camera on the USB connector, and selects an image data to be printed and instructs a printing operation, by a user interface provided in the digital camera (S80). In this case, the print settings such as for a paper size and a paper type are executed on the user interface provided in the digital camera. The digital camera transfers the print setting information, designated on the digital camera, to the printer. The printer acquires the designated print setting information from the digital camera (S81).

FIG. 9 is a view illustrating an example of the print setting information obtained from the digital camera.

In an example illustrated in (a) in FIG. 9, the print settings designated from the digital camera include a paper size: L, a paper type: PR, and a print quality: not designated (default). In the printing operation from the digital camera, the "color/monochromatic" setting is not used.

Now, again referring to the flow chart in FIG. 8, there is checked whether the print settings designated from the digital camera include an item of "no designation (default)" (S82). In the case that the item of "no designation (default)" is not included, namely in the case that the print settings are supplied from the digital camera and those necessary for the printing are already available, the camera image is printed according to the print settings designated from the digital camera (S86).

On the other hand, in the case that the print settings designated from the digital camera include an item of "no designation (default)", the sensor 20 is displaced to the setting lever reading position 32 in order to read the setting levers 25 (S83).

Then, in order to acquire the status of the setting levers 25, the sensor 20 reads one line (S84). Then the print setting analysis unit 10 analyzes the acquired results of reading of the setting levers, thereby acquiring the set values respectively indicated by the setting levers (S85).

In an example illustrated in (b) in FIG. 9, the print settings represented by the setting levers include a paper size: A4, a paper type: plain paper, a print quality: standard (and color/ monochromatic: color). A printing process for the camera image is executed, utilizing the print setting designated from the digital camera for any item that is designated from the digital camera, and the print setting obtained by reading the setting lever for any item that is not designated from the digital camera (S86).

In an example illustrated in (c) in FIG. 9, among the print settings designated from the digital camera, the print quality is designated as "no designation (default)" so that the print setting obtained by reading the setting lever 25 is used. Thus, the print settings at the printing operation become a paper size: L, a paper type: PR and a print quality: standard.

Exemplary Embodiment 2

In the multi-function printer 100 of the exemplary embodiment 1, each setting lever 25 is so constructed as to be slidable in the vertical direction, and the user executes the print setting by manipulating each setting lever. Also in analyzing the print settings, the set value is determined according to the positional information of the setting lever at the reading thereof.

FIGS. 10A and 10B is a conceptual view illustrating a positional relationship, in the exemplary embodiment 2 of the present invention, among a paper size setting lever 41 which is one of the setting levers, a sensor 20, and a slit 26.

The configuration of the exemplary embodiment 2 is similar to that of the exemplary embodiment 1, and the following description will be made, utilizing the configuration illustrated in FIG. 2.

FIG. 10A is an elevation view, and FIG. 10B is a schematic view seen from the rear side (sensor side).

Exemplary embodiment 2 utilizes a rotary lever as illustrated in FIGS. 10A and 10B.

In the following, there will be described a function, in the exemplary embodiment 2, of setting various print settings for executing the reading and printing operations.

The paper size setting lever 41 is used for designating a paper size to be used in the printing operation, and can designate a paper size "A4", "L", "2L" or "postcard" by a rotation of the lever. Also, though not illustrated, a paper type setting lever, a print quality setting lever and a color/monochromatic setting lever are constructed with similar rotary levers.

The setting lever 41, when seen from the rear side (side of the sensor 20), has a slit 26 for reading the setting lever 41, and the sensor 20 reads the setting lever 41 across the slit 26.

Also the setting lever 41, when seen from the rear side (side of the sensor 20), bears identification marks corresponding to the set values on the front surface. For example, a two-line identification mark is provided on the rear side in such a positional relationship as to correspond to the "L" on the front side, so that the sensor 20 can read the two-line identification mark upon reading the paper size setting lever 41.

In case of executing a print setting such as a paper size setting or a print quality setting at a copying operation or a direct printing operation, the sensor 20 is at first displaced to the setting lever reading position 32, as in the exemplary embodiment 1. Since the sensor 20 is normally located at the sensor stand-by position 31, the actual displacement may not be executed. Thereafter the sensor 20 executes reading of a line, thus reading the state of the setting lever 41 across the slit 26. The reading resolution in such operation need not be of a high resolution, and for example a resolution of 75 dpi is sufficient.

Then the print setting analysis unit 10 analyzes the result of reading of the predetermined area (coordinate), and analyzes the identification mark on the setting lever 41 from by the number of black blocks in the predetermined area, thereby determining the set value indicated by the setting lever 41.

For example, in the case of the setting lever 41 illustrated in FIGS. 10A and 10B, the number of the black blocks within the predetermined area is identified to indicate a paper size "A4" when the number is 1, a paper size "L" when the number is 2, a paper size "2L" when the number is 3, and a paper size "postcard" when the number is 4.

Also each of the paper type setting lever, the print quality setting lever and the color/monochromatic setting lever analyzes the result of reading in a similar manner as described above, thereby analyzing the identification mark of each setting lever and determining the setting value indicated by the setting lever.

The reading of the setting lever, the analysis of the result of reading of the predetermined area (coordinate) and the analysis of the identification mark on the setting lever, as described above, enable easy print settings for the paper size and the print quality in case of the copying or direct printing operation.

The foregoing exemplary embodiment has been described by an example of a rotary lever construction, but the present invention is not limited to such rotary lever construction but may be of any construction that allows, in response to a change in the setting lever, to determine the setting value indicated by the setting lever based on the result of reading of a predetermined area.

The foregoing exemplary embodiment has been described by an example of reading a position of the lever and analyzing a result of the reading. But, the present invention may be realized by reading a shape of the lever and analyzing a result of the reading.

Exemplary Embodiment 3

In the exemplary embodiments 1 and 2, the start key 24 is accessible by the CPU 1.

In an exemplary embodiment 3 of the present invention, the start key is constructed as a lever that can be read by the reading unit 7 through the sensor 20.

There is provided such a construction that an external light enters a predetermined area of the sensor 20 when the start key 24 is depressed, and the depression of the start key is identified in the following manner.

A reading process by the sensor 20 is executed at a predetermined interval. In this operation, the state of light reception is read, without requiring an irradiation with a light source, such as an LED. The result of reading by the sensor 20 is analyzed, and, when the data of a predetermined area (coordinate) is equal to or higher than a predetermined value, the start key is determined as being turned "ON".

In the course of reading the sensor output at a predetermined interval and analyzing the state of the start key, when the start key changes from "OFF" to "ON", the process of copying or direct printing is activated.

Also as a similar structure, the reading unit 7 may be made to read the open-close operation of the pressure plate 22 (original pressing plate) by the sensor 20. In this case, provided is such a construction that an external light enters a predetermined area of the sensor 20 when the pressure plate 22 (original pressing plate) is opened and the external light is intercepted when the pressure plate 22 is closed, and the open-close operation of the pressure plate 22 is identified in the following manner.

A reading process by the sensor 20 is executed at a predetermined interval. In this operation, the state of light reception is read, without requiring an irradiation with a light source, such as an LED. The result of reading by the sensor 20 is analyzed, and, when the data of a predetermined area (coordinate) is equal to or higher than a predetermined value, the pressure plate 22 (original pressing plate) is determined as being "open", and, when the data is smaller than the predetermined value, the pressure plate 22 is determined as being "closed".

According to the foregoing exemplary embodiments, the print settings can be easily understood since the settings made can be readily observed by merely looking at the levers for print settings. Also the foregoing exemplary embodiments, in which the levers for print settings are read by the reading unit for reading the original, require components such as the levers but do not require electric components exclusive for the reading operation, thus not involving an increase in the cost.

Therefore, the present invention provides an effect that the print settings can be easily understood, since the settings made can be readily observed by merely looking at the levers for print settings.

While the present invention has been described with reference to exemplary embodiments, it is to be understood that the invention is not limited to the disclosed exemplary embodiments. For example, the above advantages can be also obtained in so-called "push-scan" function, that is, a function capable of transferring read original data as image data to an external information processing apparatus. The scope of the following claims is to be accorded the broadest interpretation so as to encompass all such modifications and equivalent structures and functions.

This application claims the benefit of Japanese Patent Application No. 2006-245807 filed Sep. 11, 2006, which is hereby incorporated by reference herein in its entirety.

What is claimed is:

1. An image processing apparatus comprising:

a reading unit constructed to optically read an image on an original document;

a lever which is attached to the image processing apparatus and is movable to a plurality of positions and for which a position of the lever is readable by said reading unit;

a determining unit constructed to specify a position of the lever by optically reading an image of the lever by the reading unit and to determine a setting for processing by the image processing apparatus in accordance with the specified position of the lever; and a control unit constructed to perform processing based on the setting determined by the determining unit.

2. The apparatus according to claim 1, further comprising a printing unit configured to print an image based on image data, wherein the control unit controls the printing unit so as to print the image based on the setting determined by the determining unit.

3. The apparatus according to claim 2, wherein the control unit, in a case where a copying process is performed, causes the reading unit to read the image of the lever and then causes the reading unit to read the image of the original document based on the setting determined by the determining unit and causes the printing unit to print an image of the original document read by the reading unit based on the setting determined by the determining unit.

4. The apparatus according to claim 1, wherein the lever is attached in a location outside of an original document reading range by the reading unit.

5. A controlling method of image processing apparatus comprising:

optically reading, by a reading unit of the image processing apparatus, an image of an original document;

optically reading, by using said reading unit of the image processing apparatus, an image of a lever which is attached to the image processing apparatus and is movable to a plurality of positions and for which a position of the lever is readable by the reading unit;

specifying a position of the lever based on the optically read image of the lever;

determining a setting for processing by the image processing apparatus in accordance with the specified position of the lever; and performing processing by the image processing apparatus based on the determined setting.

6. A non-transitory computer readable storage medium storing a computer executable program for controlling an image processing apparatus, the program comprising:

optically reading, by a reading unit of the image processing apparatus, an image of an original document;

optically reading, by using said reading unit of the image processing apparatus, an image of a lever which is attached to the image processing apparatus and is movable to a plurality of positions and for which a position of the lever is readable by the reading unit;

specifying a position of the lever based on the optically read image of the lever;

determining a setting for processing by the image processing apparatus in accordance with the specified position of the lever; and performing processing by the image processing apparatus based on the determined setting.

* * * * *